US008370911B1

(12) United States Patent
Mallard

(10) Patent No.: US 8,370,911 B1
(45) Date of Patent: Feb. 5, 2013

(54) SYSTEM FOR INTEGRATING MULTIPLE ACCESS CONTROLS SYSTEMS

(76) Inventor: George Mallard, The Woodlands, TX (US)

( * ) Notice: Subject to any disclaimer, the term of this patent is extended or adjusted under 35 U.S.C. 154(b) by 480 days.

(21) Appl. No.: 12/274,799

(22) Filed: Nov. 20, 2008

(51) Int. Cl.
*H04L 29/06* (2006.01)
*G06F 21/00* (2006.01)

(52) U.S. Cl. .......................................... 726/7; 713/185
(58) Field of Classification Search ....................... 726/7
See application file for complete search history.

(56) References Cited

U.S. PATENT DOCUMENTS

| | | | |
|---|---|---|---|
| 2,714,201 A | | 7/1955 | Whitehead |
| 3,432,654 A | * | 3/1969 | Reich ........................ 246/187 R |
| 4,148,012 A | * | 4/1979 | Baump et al. ................ 340/5.33 |
| 4,341,288 A | | 7/1982 | Bass |
| 4,431,086 A | | 2/1984 | Moser et al. |
| 4,590,604 A | | 5/1986 | Feilchenfeld |
| 4,644,484 A | | 2/1987 | Flynn et al. |
| 4,839,640 A | | 6/1989 | Ozer et al. |
| 5,200,583 A | | 4/1993 | Kupersmith et al. |
| 5,422,634 A | * | 6/1995 | Okubo ......................... 340/5.24 |
| 5,721,909 A | | 2/1998 | Oulid-Aissa et al. |
| 5,749,443 A | | 5/1998 | Romao |
| 5,796,828 A | * | 8/1998 | Tsukamoto et al. .......... 380/203 |
| 6,233,588 B1 | * | 5/2001 | Marchoili et al. ................ 726/4 |
| 6,578,125 B2 | * | 6/2003 | Toba .............................. 711/167 |
| 6,707,374 B1 | | 3/2004 | Zaharia |
| 7,356,129 B1 | * | 4/2008 | Moody ........................... 379/45 |
| 7,752,652 B2 | * | 7/2010 | Prokupets et al. ................ 726/2 |
| 2003/0151493 A1 | * | 8/2003 | Straumann et al. .......... 340/5.25 |
| 2004/0172309 A1 | * | 9/2004 | Selwanes et al. ................. 705/4 |
| 2006/0290464 A1 | * | 12/2006 | Willems et al. ................ 340/3.1 |
| 2007/0050634 A1 | * | 3/2007 | Makimoto et al. ............ 713/182 |
| 2007/0057057 A1 | | 3/2007 | Andresky et al. |
| 2007/0069850 A1 | * | 3/2007 | Anderson et al. ............ 340/3.51 |
| 2008/0003975 A1 | * | 1/2008 | Kim et al. ................... 455/404.1 |
| 2008/0148059 A1 | * | 6/2008 | Shapiro ......................... 713/186 |
| 2008/0216156 A1 | * | 9/2008 | Kosaka .............................. 726/4 |
| 2008/0290161 A1 | * | 11/2008 | Blake ............................ 235/382 |
| 2009/0028141 A1 | * | 1/2009 | Vu Duong et al. ............ 370/389 |

OTHER PUBLICATIONS

KMS, "Laredo Cut Sheet", Feb. 2007.
Mallard, "Future of access control tied to integration", Access Control Magazine vol. 34, No. 10 Sep. 1991, pp. 1, 9-11.
Sprik, "HID application note AN004", Sep. 21, 1998 pp. 9-11. www.hidglobal.com/documents/0004_an_en.pdf.
HID, "Understanding Card Data Formats" 2005 http://www.hidglobal.com/documents/understandCardDataFormats_wp_en.pdf.
HID, "Understanding the Corporate 1000" 2005 http://www.hidglobal.com/documents/understandingCorp1000_wp_en.pdf.
Cypress Computer Systems, Inc. model SIO-7200. 2005 http://cypressworld.net/index.htm?p=spec&cat=SIO-7200.
Cypress Computer Systems, Inc. model DPX-7200, Sep. 2003 http://www.cypressworld.com/CD/PDF/cutsheet/DPXCutSheet.pdf.
Cypress Computer Systems, Inc. model DPX-7200 user manual, 2004 http://www.cypressworld.com/CD/PDF/Duprex/DPX-7200.pdf.

(Continued)

*Primary Examiner* — Philip Chea
*Assistant Examiner* — Shu Chun Gao
(74) *Attorney, Agent, or Firm* — R. Perry McConnell; The McConnell Law Firm

(57) ABSTRACT

In a location where a number of entities share a common area and where those entities wish to exclude unauthorized individuals yet desire access for a set of individuals from each entity, a system, using networking techniques, integrates a plurality of independent entity access control systems in which each system authorizes credentials from one of the plurality of entities to control access to each individual entity area.

9 Claims, 8 Drawing Sheets

OTHER PUBLICATIONS

Cypress Computer Systems, Inc. model DPX-7200 application note, Nov. 18, 2004 http://cypressworld.com/271101/CD/Duprex/Ethernet/AN-SY-DPX-7200-1_v100.pdf.

HID Model RP40 multiCLASS Reader 6125, 2007 http://www.hidglobal.com/documents/rp15_rp40_rpk40_ds_en.pdf.

Backend Authentication Work Group, "Framework for Interagency Authentication of Federal Personal Identity Verification (PIV) Cards", Aug. 2006, http://www.smart.gov/iab/doc.

Digi International ME connector style embedded module Specification Sheet, 2004 http://www.digi.com/pdf/prd_ds_digiconnectme.pdf.

Lantronics, Inc. XPORT Embedded Ethernet Device Server Specification Sheet, Mar. 2008 http://www.lantronix.com/pdf/XPort_PB.pdf.

Texas Instruments Incorporated MSP430 Specification Sheet 2008, http://focus.ti.com/lit/ml/slab034n/slab034n.pdf.

\* cited by examiner

SYSTEM FOR INTEGRATING MULTIPLE ACCESS CONTROLS SYSTEMS

TECHNICAL FIELD OF THE INVENTION

The present invention relates generally to microprocessor based security systems, and more particularly to electronic security systems where a credential is used to generate an electrical code.

BACKGROUND ART OF THE INVENTION

In many real estate settings common areas may be shared among several different entities. These common areas must be crossed to gain access to the entities' private areas. For example in an office tower several large tenants share the lobby, parking areas and elevators. During off hours these common areas are restricted to authorized individuals. Each entity may wish access for thousands of individuals to these public areas in order to access their private space. As an example consider a high rise office tower housing several corporations each with thousands of employees. It is common practice for each entity to equip their personnel with electronically readable credentials (coded indicia) which serve as a key to access the entities' private areas. These credentials when used in conjunction with electrically controlled locks on the portals and computer databases are known as card access systems. The advantages of card access systems as taught by U.S. Pat. No. 2,714,201 Identification Selector at Column 1 lines 33-52 are well known to the owners and managers of these properties.

As these systems have proliferated it has become common for each entity within the building to purchase their own proprietary access control systems. The owners and managers of these properties desire to accommodate each entity's desire to grant access to authorized individuals yet deny access to all others. The property managers could either issue their own credentials to all authorized people, allow each entity to mount their own credential reader and controls on the building portals, have each entity periodically share a list of authorized credentials, or require the entities to expose their credential databases on a common network. Each of these techniques has significant disadvantages as described below.

Issuing everyone their own building management credential has several disadvantages. First, it requires the purchase and distribution of credentials for everyone authorized to use the common spaces afterhours. Typically the common area credentials are incompatible with the entity's proprietary standards for credentials. Therefore, this technique often requires the individuals to carry multiple credentials. Additionally, the building management must be kept abreast of each entity's personnel changes. The typical implementation is a manual system of faxed or emailed paper work. A common problem with a manual system is the building's database becoming "stale" with outdated information. The result can be terminated individuals still having access to the building and newly hired individuals being denied access because the system which transmits the changes from the tenant to the building management has broken down. The results can range from inconvenience for the new hires to a potentially dangerous situation where an aggressive terminated employee has afterhours access to the common areas.

Allowing each entity to mount their own credential reader and control system on the building portals results in an aesthetically disagreeable and confusing collage of credential readers at each of the building portals. Additionally if one of the controlling systems should fail often the buildings doors are either locked or unlocked at the wrong times and the resultant afterhours service requires both coordination of multiple vendors and extensive diagnostics on the part of the common area's management to determine which panel has failed. Even knowing which tenant's panel has failed then requires common area's management to know which vendor to call as some entities frequently change access control vendors.

If the tenant and the management can agree upon a specific credential technology then building management can update their database of valid access credentials based on a database extraction of the tenant's system. The issue of choosing a specific credential technology has been eased by the introduction of credential readers capable of reading multiple technologies. An example of a multi-technology credential reader is taught by U.S. Patent Application Publication No. 2007/0057057 Synchronization Techniques In Multi-Technology/Multi-Frequency RFID Reader Arrays Page 1 Paragraph [0011] and embodied by the HID Model RP40 multiCLASS Reader 6125. http://www.hidglobal.com/documents/rp15_rp40_rpk40_ds_en.pdf An example implementation of this technique was demonstrated by George Mallard's article "Future of access control tied to integration" in Access Control Magazine Volume 34, Number 10 Sep. 1991, page one. This solution works well and addresses the aesthetic and service problems of multiple credential readers at the building portals. This solution partially addresses the "stale" database problems because the download and processing cycles are typically a batch process it can take some time for the credential issued by the tenant to become active in the building's system. Additionally, the maintenance of the database transfer can be problematic and requires customization of both the entity's and the building management's access control systems software to accommodate the extraction and importing of each entity's authorized credential list. Finally, many companies have become reluctant to share a list of their credential holders with outside entities.

The Federal Government has addressed this same problem of authentication of credentials where several agencies need access to a shared portal. Their method of cross agency authentication is documented by the Backend Authentication Work Group prepared for the Federal Smart Card Interagency Advisory Board (IAB), "Framework for Interagency Authentication of Federal Personal Identity Verification (PIV) Cards", August 2006, http://www.smart.gov/iab/documents/FrameworkInteragencyAuthenticationFederalPIV.pdf. This method defines a protocol where one agency can query another agency's security database over a network. Where this method addresses the problem of multiple entity authentications, it does require each entity to expose their security database on a common network and all entities to conform to a standard protocol. On page seven of the report the authors note that "A secure means of transporting these messages must be devised". Further on page 12 the authors state "The most important aspect of this security (since the message payload will be encrypted) is that a gateway can trust that the message was sent by another trusted gateway". The Federal Government has the resources to implement the security required by this technique. However, in a commercial environment costs are a factor. Therefore, as is known to those skilled in the art, the cohabitation of databases on a common network is both expensive to implement and maintain and opens the possibility of unauthorized access to sensitive information. The standard protocol for exchange of information may not be supported by all entities and therefore require expensive modifications to their access control systems. These factors make the common protocol choice unattractive for commercial users.

The reader communicates the alphanumeric code read from the individual's credentials to the control panel utilizing serial data, clock plus data, or the Weigand interface well known to those skilled in the art. Serial data is sent using an interface standard such as defined by the RS485, RS232, RS422 or other standard. The Weigand interface was defined by Sensor Engineering in the early 1980's and is documented in the HID application note AN004.DOC prepared by Eric Sprik Sep. 21, 1998 page 9 www.hidqlobal.com/documents/0004 an en.pdf also the 2005 HID document "Understanding Card Data Formats" http://www.hidqlobal.com/documents/understandCardDataFormats_wp_en.pdf documents the Weigand message structure.

As gleamed from Tech Tip #5 within Mr. Sprik's AN004.DOC page 11, the structure of a common indicia coding are shown in FIG. 3A and FIG. 3B. A credential with an indicium facility code of 159 and a personal identification number of 2199 are illustrated in both Figures. This coding has 26 binary digits or bits formed from the two parity bits (301, 304), the eight facility code bits (302), and the sixteen personal identification number bits (303).

First refer to FIG. 3A to understand the error checking. The first parity bit (301) is set so that the count of bits with a value of 1 in the combined set of the parity bit (301) and the first twelve significant bits (307) is an even number, in this case six. This scheme is known as "even parity".

The second parity bit (304) is set so that the count of bits with a value of 1 in the combined set of the parity (304) and the last twelve significant bits (306) is an odd number, in this case seven. This scheme is known as "odd parity". Parity is used to insure the coding was correctly read from the credential.

Now refer to FIG. 3B to understand the structure of the indicia coding. The eight bits used for the facility code (302) defines a set of two hundred and fifty six unique facility codes. In FIG. 3B (302) the facility code shown is 159. The sixteen bits of the personal identification number (303) defines a set of sixty five thousand, five hundred and thirty six unique personal identification numbers. In FIG. 3B (303) the personal identification number is 2199.

An entity will be assigned a facility code so that their credentials will be distinct from every other entity's credentials. Consider telephone numbers, a person in Houston could have the same seven digit phone number as someone in New York. But the area codes make the phone number unique. In the same manner a twenty six bit credential from entity A may have the same personal identification number as someone from entity B. The facility codes make the credentials unique. Since this twenty six bit coding scheme was devised by Sensor Engineering in the late 1970's the success of access control equipment has outdated the twenty six bit coding scheme.

Newer schemes with many more bits both for the facility codes and the personal identification number have been devised which allows the manufacturer to enter into agreements that allow the entities to "own" their facility codes. This practice is documented in the 2005 HID white paper "Understanding the Corporate 1000" page 1 http://www.hidqlobal-.com/documents/understandingCorp1000_wp_en.pdf. It should also be noted that some of these newer schemes have more parity bits and/or error checking and correction bits known to those skilled in the art. Essentially any of the techniques used for error checking and/or correction in serial data transmission, for example Cyclic Redundancy Checking can be employed for the credential indicia.

As taught by U.S. Pat. No. 4,839,640 Access control system having centralized/distributed control at Column 9 lines 31-39 the basic architecture of electronic access control equipment is well known to those skilled in the art.

Referring to FIG. 2, the individual 200 approaches portal (209) and presents his credentials to reader (201). The electrically encoded identification is transmitted to control panel (202) via connection (206). The panel (202) then formats this identification into a message and transmits it to the monitoring computer (204) via communication line (203). This message is received by the computer (204). The computer (204) processes the message, typically by consulting a database of authorized users, and then returns a message that either authorizes or denies access to the portal (209). The panel (202) receives the message from communication line (203) and, if authorized, the individual is granted access to the portal (209) by the closure of an electrical contact within panel (202) releasing electrical locking device (208) via connection (205).

Only the access control panel (202) release circuitry is shown for the locking device (208*a*). Other circuitry required to provide life safety functionality and operate the lock have been omitted for clarity. Some examples omitted circuitry include the lock power supply, request to exit device, fire alarm interface, an exit button with time delay, and alarming functions to alert monitoring personnel that the lock has malfunctioned or has been propped open.

It should be noted that U.S. Pat. No. 4,644,484 Stand-alone access control system clock control at Column 2 lines 38-41 teaches that the cardholder database can be incorporated within the control panel (202).

The Laredo interface as produced by KMS Systems, Inc. which was demonstrated to the public at TechSec in Dallas February 2007 incorporated certain features used in the present invention. However, the Laredo system neither received broadcasts of the individual's credential request nor tested portions of the credential coding against a predefined list before transmitting the credential coding to the entity's legacy access control panel. Nor did the Laredo demonstrated transmit messages indicating a Deny, Time Expired, Handicap, or Invalid Facility Code.

A method to extend credential reader signals point to point over a network is illustrated by the Cypress Computer Systems, Inc. single reader extender model SIO-7200. http://cypressworld.net/index.htm?p=spec&cat=SIO-7200 and the dual reader version DPX-7200 http://www.cypressworld-.com/CD/PDF/cutsheet/DPXCutSheet.pdf. As described on page one of the Cypress Computer System user manual, http://www.cypressworld.com/CD/PDF/Duprex/DPX-7200.pdf the 7200 series is a paired central and remote point to point network devices. The Nov. 18, 2004 setup document http://cypressworld.com/271101/CD/Duprex/Ethernet/AN-SY-DPX-7200-1_v100.pdf further illustrates this with the central device's IP address requiring the remote device's IP to be entered in the setup, page 8. Similarly the remote device's IP is required when setting up the central device. In contrast to a point to point system, the present invention described herein is a multipoint network system.

It should be noted that while the present invention incorporates some of the elements of a distributed database system as taught for example by U.S. Pat. No. 5,721,909 Distributed Database Architecture and Distributed Database Management System for Open Evolution at Column 1 lines 32-40, the present invention lacks points 3 ("true database not a collection of files that are stored at each node") and 4 ("the full functionality of a database management system"). In the present system, as each entity manages their own list of credentials (files) so that present the invention is not a true database. In the present system, by design, there is no mechanism or administrator feature that would allow a single entity to manage all the access control system's databases.

SUMMARY OF THE INVENTION

The invention disclosed herein addresses the problems outlined above with the unique solution of the building's access control system reading the credential indicium and repeating the entire indicium to each entity's proprietary access control system. A Pseudo-Reader (receiver) is employed to generate impulses compatible with the entity's proprietary system credential reader inputs. The invention then waits for the proprietary system to either grant or deny the credential. The "pseudo-reader" relays this decision to the networked access control panel controlling the portal and if appropriate grants access.

The present invention compartmentalizes security by providing each device in the system with just enough information and privileges to decide if a credential is allowed entry. The present invention does not require exposure of the entity's entire database either by transfer to a third party or on a conventional network. The indicium is presented as a credential read at the entity's card reader input. Thus, the only input operation possible from the present invention is the transmission of a credential's indicium. The only information returned from the entity is the credential's validity for a particular portal. The scope of these two operations is enforced by the entity's access control system hardware. Thus, the entity's database is shielded from wholesale attack and possible compromise.

The present invention allows the entities to authorize access to their individuals within the framework of their ordinary internal processes. The present invention does not require disclosure of the complete list of credentials nor does it require extensive modifications of existing systems. An additional benefit offered by the present invention is changes in the entity's list of authorized users are implemented immediately without the lag time normally associated with conventional methods.

Extending the credential indicium via a network access control panel to a plurality of Pseudo-Readers panels, a single credential read can be tested by number of entities. Also, a single Pseudo-Reader panel can service a number of portals controlled by network access control panels. Thus, network Pseudo-Reader panels and network access control panels form a network web which can service a plurality of portals FIG. 1 (209a) through (209n) from a plurality of entities FIG. 1 (202a) through (202n).

BRIEF DESCRIPTION OF THE DRAWINGS

For a more complete understanding of the present invention and for further advantages thereof, reference is now made to the following description taken in conjunction with the accompanying drawings in which.

DESCRIPTION OF THE PREFERRED EMBODIMENT

Figure 1:
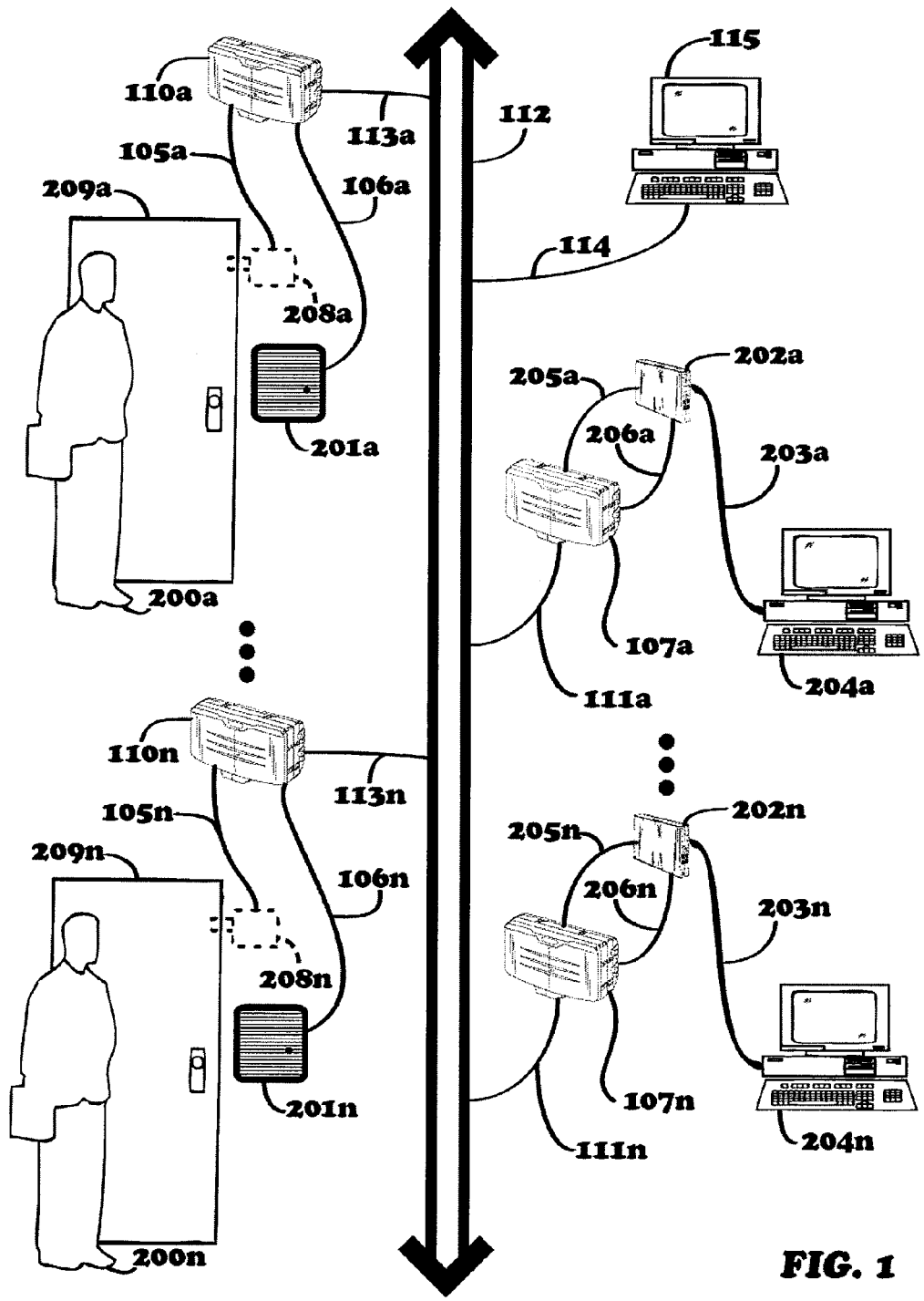
FIG. 1 is a block diagram illustrating the present system for integrating multiple access control systems.
Figure 2:
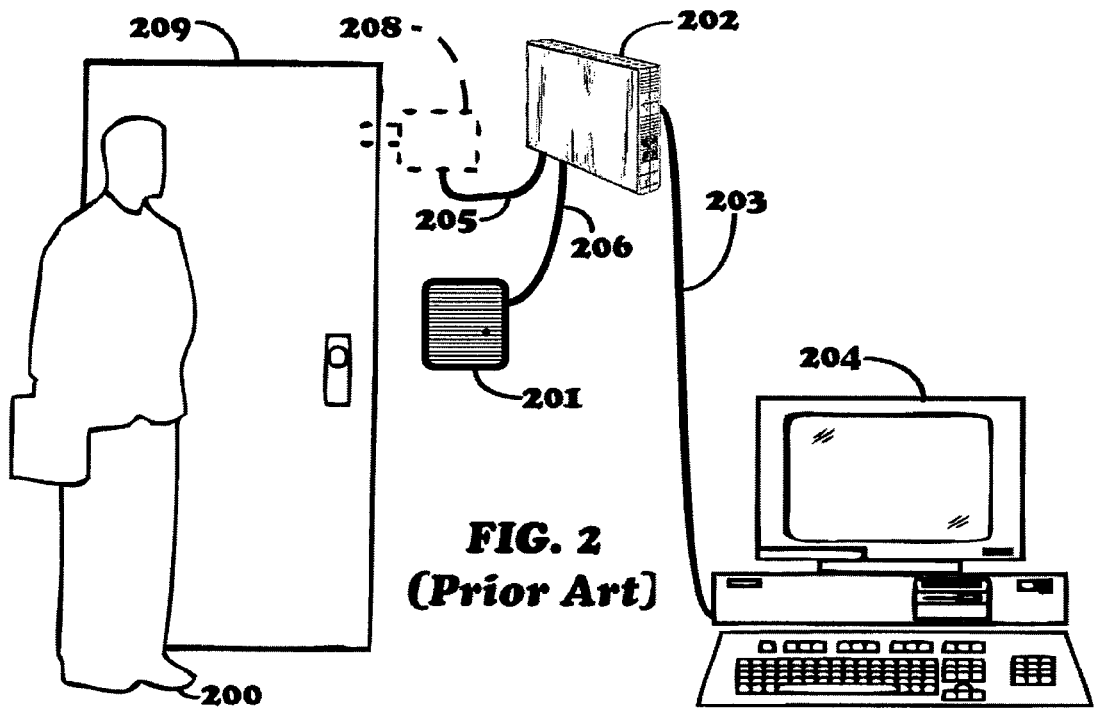
FIG. 2 is a block diagram of a prior art access control system.

Referring to FIG. 1, access to users (200a though 200n) through the portals (209a through 209n) is controlled by electric locking devices (208a through 208n) which in turn are controlled by the respective network enabled access control panels (110a through 110n). Credential readers (201a through 201n) are connected to the respective network enabled access control panels (110a through 110n) via connections (106a through 106n). The network enabled access control panels (110a through 110n) are connected to the network (112) by cables (113a through 113n). Pseudo-Reader panels or receivers (107a through 107n) are connected to network (112) by cables (111a through 111n). Pseudo-Reader panels (107a through 107n) are connected to the entity's legacy access control panels (202a through 202n) reader inputs by connections (206a through 206n). The entity's legacy access control panels (202a through 202n) outputs which are typically used to control locking devices are connected to the Pseudo-Reader panels (107a through 107n) by respective connections (205a through 205n). The entity's legacy access control panels (202a through 202n) connect to their respective database computer systems (204a through 204n) by cables (203a through 203n).

A management computer (115) is provided to implement a standard access control system for credentials issued by the property management. It is connected to the network by connection (114). In addition to administering property management credentials computer (115) provides audit functions for previous entries and attempted entries. This computer (115) also provides the functions of historical entry logging and alerting monitoring personnel. Alerting function includes an invalid credential attempting entry, door lock malfunctions, and doors being propped or forced open. It should be noted that the functions of credential management, audit, history logging, and alerts may be divided among a plurality of computers (115).

The individual (200a) approaches portal (209a) and requests access by presenting his credentials to the credential reader (201a). The credential reader (201a) reads the credential and translates it into an electrically encoded indicium. The indicium is transmitted to network enabled control panel (110a) via connection (106a). The panel then formats this indicium into a network message and places it on the network (112) via network connection (113a). This message is received by a plurality of Pseudo-Reader panels (107a through 107n) via network connections (111a through 111n).

The Pseudo-Reader panels (receivers) (107a through 107n) examine the Facility Code from the credential. If the Facility Code matches the entity's Facility Code, the Pseudo-Reader panel generates either a Weigand pulse stream or serial data stream which reflects the electrically encoded identification as it would be generated by an actual credential reader (201a through 201n). This identification data stream is directed into the entity's legacy access control system via connection (206a through 206n). The entity's legacy access control system will then vet the credentials by ordinary means as described in the prior art and indicate an authorized user by activating an electrical contact within (202a through 202n).

These electrical contacts are typically used for controlling a door lock but in the present invention it is monitored by Pseudo-Reader panels (107a through 107n) via connection (205a through 205n) If indicated by the electrical contact an authorization message will be generated and placed on the network (112). The network enabled access control panel (110a) receives messages from the network (112) via network connection (113a) and if a grant message is received from one or more Pseudo-Reader panels (107a through 107c) the individual (200a) is granted access to the portal (209a) by releasing electrical locking device (208a) via connection (105a).

Figure 4A:
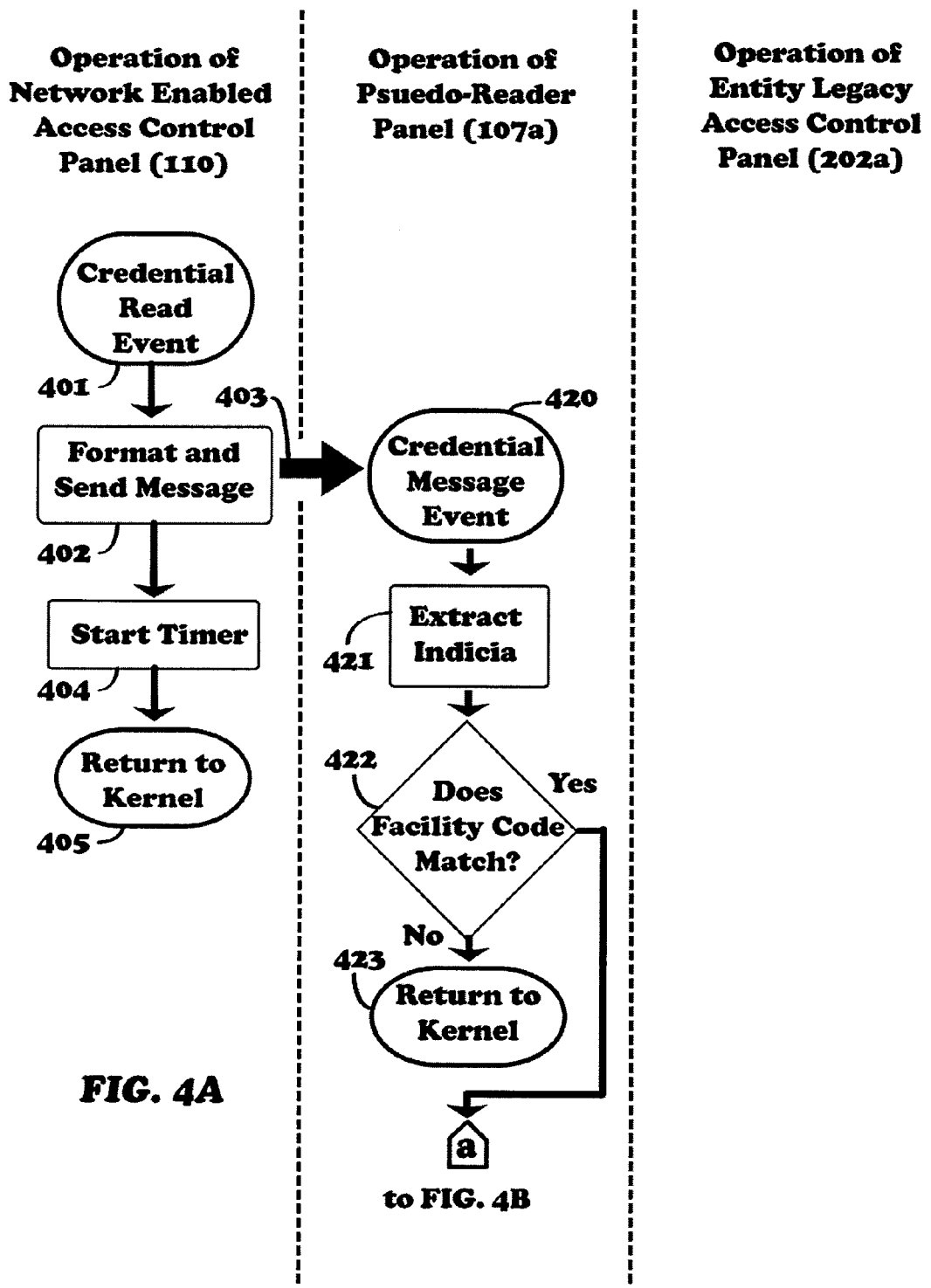
FIGS. 4A, 4B and 4C is a flow diagram illustrating operation of the present system.
Figure 4B:
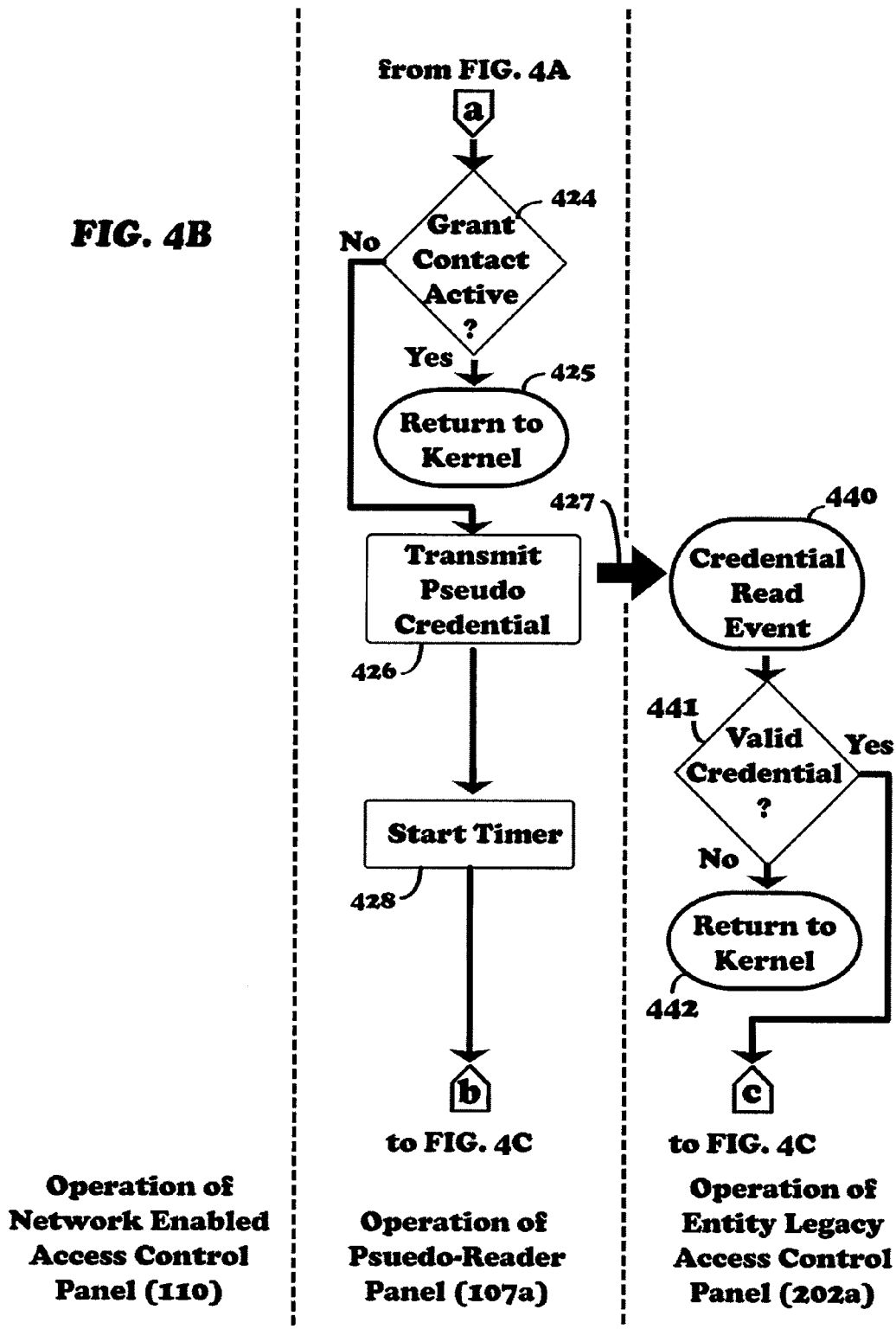
Figure 4C:
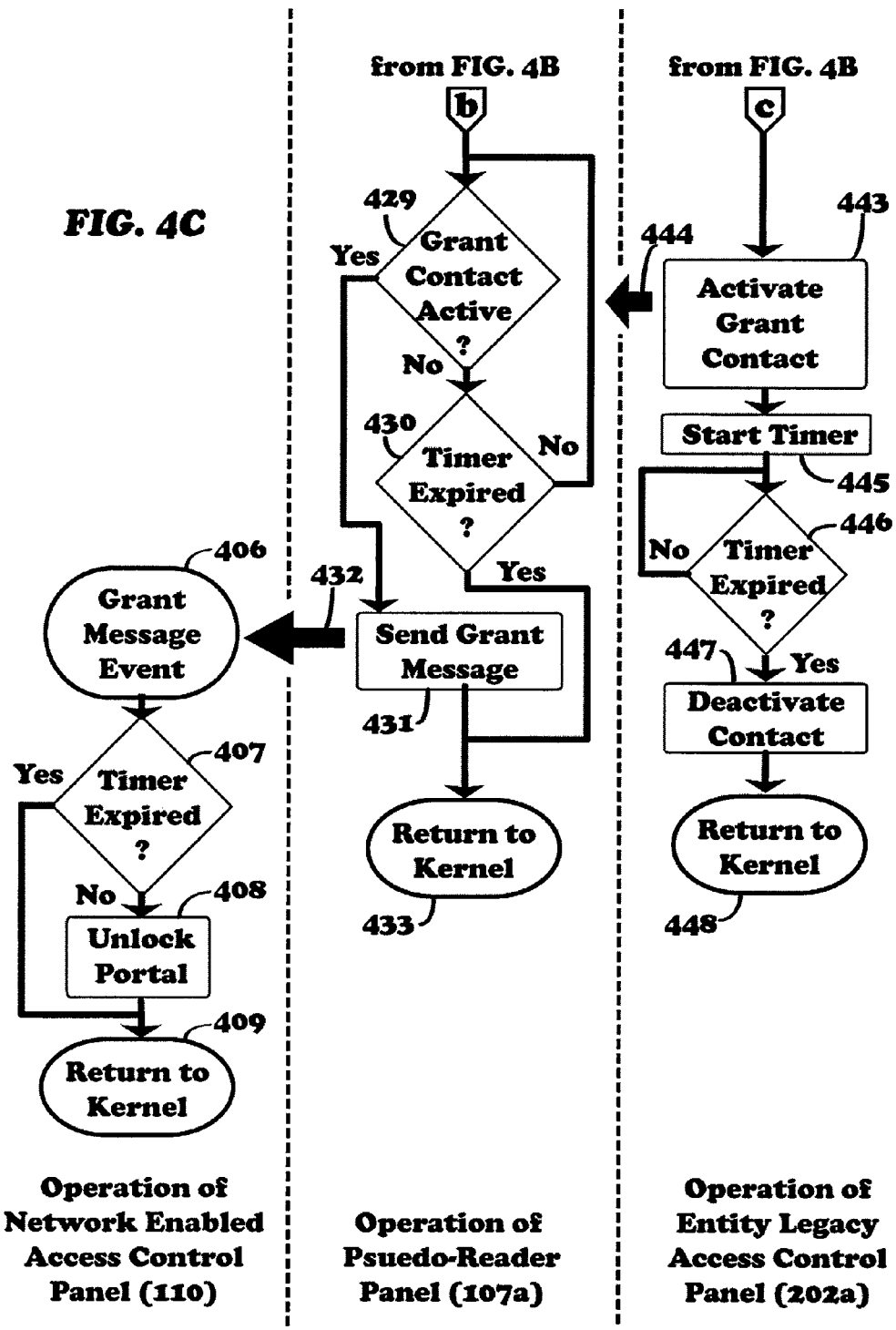

The simplified flowchart FIG. 4A, FIG. 4B and FIG. 4C show the interaction between the three elements to grant a credential access to the portal FIG. 1 (209a) from the entity's legacy card access system FIG. 1 (202a). Those three elements are the network enabled access control panel FIG. 1 (110a) that controls the portal FIG. 1 (209a), the Pseudo-Reader panel FIG. 1 (107a), and the entity's legacy access control panel FIG. 1 (202a).

Figure 6:
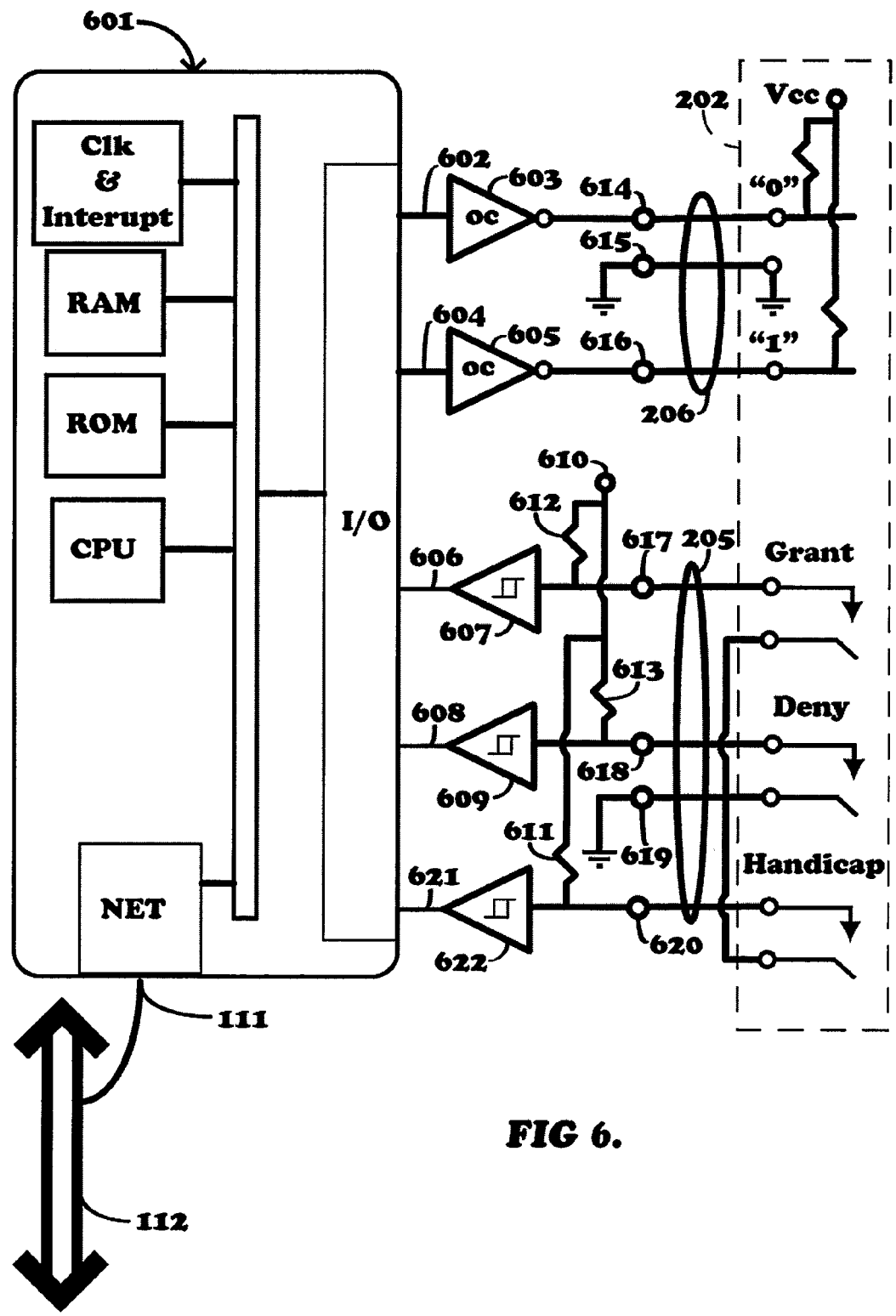
FIG. 6 is a schematic-block diagram of pseudo-reader panel for use with the system of the present invention.

The flowchart does not consider the scheme where the entity's legacy access control panel FIG. 6 (202a) presents a "Deny" or "Handicap" relay contact to the Pseudo-Reader panel FIG. 6 (107a). Instead the Pseudo-Reader panel FIG. 1 (107a) grant timer will expire waiting for a grant indication from the legacy access control panel FIG. 1 (202a) if the credential is not valid.

Figure 5:
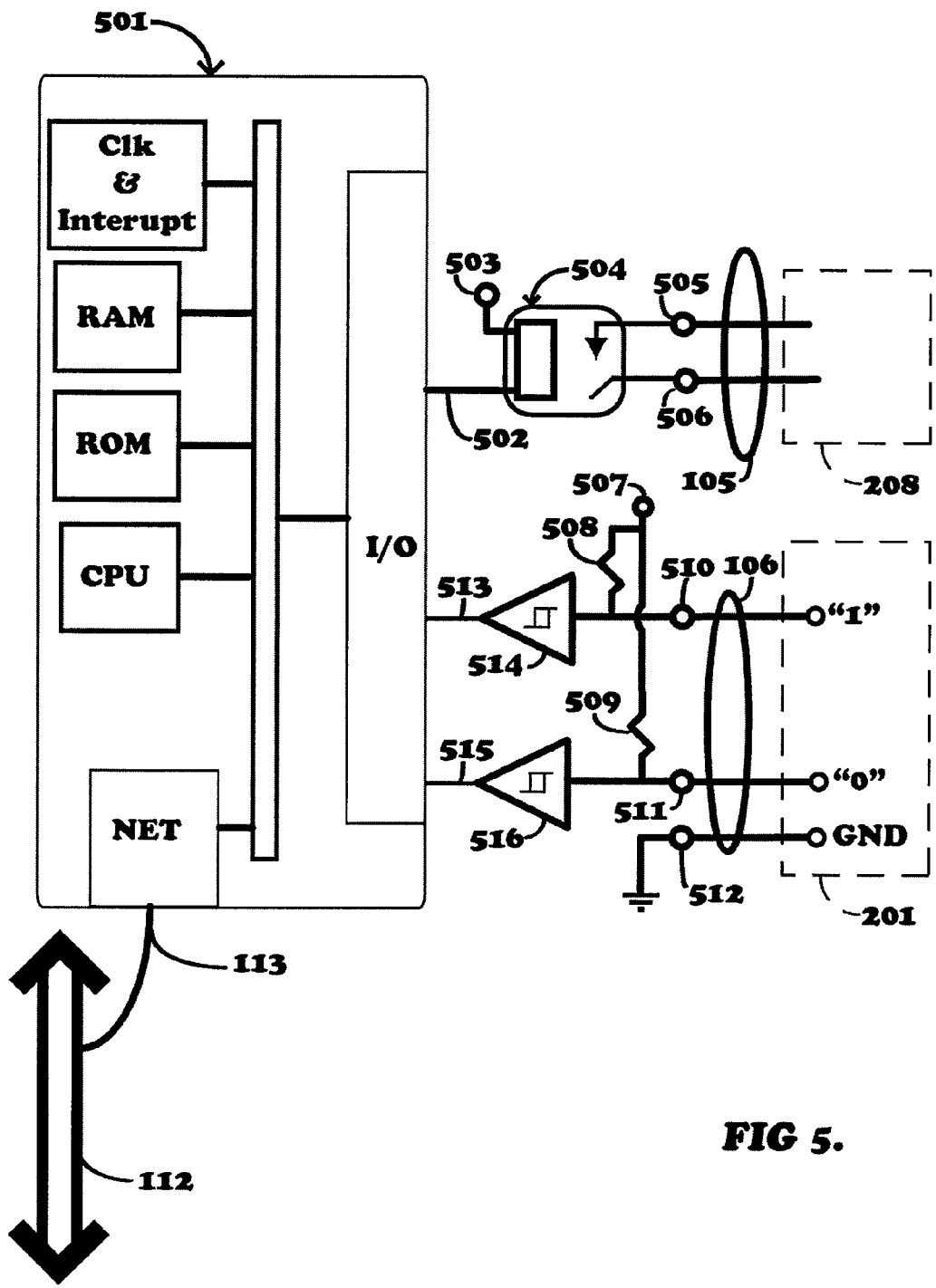
FIG. 5 is a schematic-block diagram of network enabled access control panel for use with the system of the present invention.

The network processor FIG. 5 (501) incorporated into each of the network enabled access control panels FIG. 1 (110a through 110n) has kernel software typically provided by the network processor manufacturer. Network maintenance and other housekeeping tasks are typically performed by the kernel software. Message processing is an interrupt response routine which is called from the kernel software. When a credential is read at reader FIG. 1 (201a) the network enabled access control panel FIG. 1 (110a) kernel software interrupts what it was doing and calls the procedure starting at Credential Read Event FIG. 4A (401). When a grant message is received from the network FIG. 5 (112) the network processor FIG. 5 (501) kernel software calls the message processing procedure which starts at Grant Message Event FIG. 4C (406). Ping requests, Arp requests and other network housekeeping functions are handled by the network processor's kernel software and are not typically forwarded to message handling interrupt procedures.

As is known to those skilled in the art, one network processor FIG. 5 (501) could service a plurality of portals and readers if equipped with a suitable number of inputs and outputs.

The message FIG. 4A (403) is sent out on the network for the Pseudo-Reader panels FIG. 1 (107a through 107n) to receive. Control of the network processor FIG. 5 (501) is passed back to the kernel software in Return to Kernel FIG. 4A (405).

The Pseudo-Readers panels FIG. 1 (107a through 107n) each have a network processor FIG. 6 (601). The network processor incorporates kernel software which performs network maintenance and other housekeeping tasks. When a message is received from the network FIG. 6 (112), the Pseudo-Reader's network processor FIG. 6 (601) kernel software calls the message processing procedure starting at Credential Message Event FIG. 4A (420). The credential is processed and control is passed back to the kernel software in Return to Kernel FIG. 4A (423) or FIG. 4C (433). Ping requests, Arp requests and other network maintenance functions are handled by the network processor's kernel software and are not typically forwarded to message handling interrupt procedures.

As is known to those skilled in the art, one network processor FIG. 6 (601) could service a plurality of entity reader panels if equipped with a suitable number of inputs and outputs.

Referring to FIG. 4A, FIG. 4B and FIG. 4C to understand the following narrative of overall process flow, the narrative includes three example credentials. The first credential will be denied because Facility Code is not valid. The second credential will be denied because the personal identification number is not valid for the entity. The third example credential presented will be valid and granted access.

Consider the process flow when the first example credential does not belong to the entity's set of credentials. When a credential is read the network enabled access control panel FIG. 1 (107a) kernel software passes control to Credential Read Event (401), transmits the message (403) in Format and Transmit Message (402), and starts the transaction timer (404). Finally, control is returned to the kernel software in Return to Kernel (405).

The Pseudo-Reader panel FIG. 1 (107a) kernel software passes control to Credential Message Event (420) upon reception of the Credential Message (403) then Extract Indicia (421) processes the message to extract the Facility Code. The Facility Code Match (422) "No" branch is taken and control is returned to the kernel software in Return to Kernel (423). As is known to those skilled in the art, a message indicating a Facility Code failure can be transmitted over the network FIG. 1 (112) by the Pseudo-Reader panel when the indicium failed the Facility Code Match (422) before Return to Kernel (423).

Consider the process flow for the second example credential that is not valid for the entity associated with Pseudo-Reader panel FIG. 1 (107a). When a credential is read the network enabled access control panel FIG. 1 (107a) kernel software passes control to Credential Read Event (401), transmits the message (403) in Format and Transmit Message (402), and starts the transaction timer (404). Finally, control is returned to the kernel software in Return to Kernel (405).

The Pseudo-Reader panel's FIG. 1 (107a) kernel software passes control to Credential Message Event (420) upon reception of the Credential Message (403), then Extract Indicia (421) processes the message to extract the Facility Code. The next step tests the Facility Code Match (422). This credential passes the test and control flows via the "Yes" branch to test if the Grant Contact is Active (424).

If the grant contact is active then Grant Contact Active (424) "Yes" branch is taken and control returns to the kernel (425). This prevents an entity from granting a credential that was read immediately after another credential was granted, but before the entity's panel has reached Return to Kernel (448) for that previous credential processing.

An alternative implementation of the "granting procedure" is another interrupt driven procedure where the interrupt is driven by the contact going active, otherwise known as edge triggering. As the network processor FIG. 6 (601) waits for the contact to move from the inactive to the active state, the test of the Grant Contact Active (424) is not needed.

The Grant Contact Active (424) "No" branch leads to Transmit Pseudo Credential (426) via message (427). The grant timer is started (428), the entity's legacy access control panel grant contacts are tested (429), and the grant timer is tested (430). If neither the contacts test active (429), nor the timer has expired (430), then the Pseudo-Reader panel loops again, testing both the contacts (429) and the timer (430). In this case the timer expires (430) because the example credential is not valid for the entity's legacy access control panel FIG. 1 (202a).

The credential message (427) passes the indicium to the entity's legacy access control panel FIG. 1 (202a). Upon receiving the credential indicium, the entity's kernel software responds by calling the Credential Read Event (440). The credential is vetted in Valid Credential (441), just as it would from a directly attached credential reader. Because the credential is not valid, the "No" branch is taken and control returns to the kernel software via Return to Kernel (442).

After the grant timer expires in the Pseudo-Reader panel FIG. 1 (107a), control is passed back to the kernel software via the "Yes" branch of Timer Expired (430), then Return to Kernel (433). As is known to those skilled in the art, it is possible to add a Deny or Timer Expired message transmission into the "Yes" branch of Timer Expired (430) before Return to Kernel (433).

The process flow for the third example credential that is valid for the entity is now considered. When a credential is read, the network enabled access control panel FIG. 1 (107a) kernel software passes control to Credential Read Event (401), transmits the message (403) in Format and Transmit Message (402), and starts the transaction timer (404). Finally, control is returned to the kernel software in Return to Kernel (405).

The Pseudo-Reader panel's FIG. 1 (107a) kernel software passes control to Credential Message Event (420) upon reception of the Credential Message (403), then Extract Indicia (421) processes the message to extract the Facility Code. The next step tests the Facility Code in Facility Code Match (422). This credential passes the test and control flows via the "Yes" branch to test Grant Contact Active (424). For this example, assume the entity's Grant Contacts are inactive and control flows out the "No" branch of Grant Contact Active (424) to Transmit Pseudo Credential (426) via message (427). The grant timer is started (428), the entity's legacy access control panel Grant contacts are tested (429) and the grant timer is tested (430). If neither the contacts have become active (429), nor the timer has expired (430); then the Pseudo-Reader panel loops again, testing both the contacts (429) and the timer (430).

The message (427) passes the credential indicium to the entity's legacy access control panel FIG. 1 (202a). Upon receiving the credential indicium, the entity's kernel software responds by calling the Credential Read Event (440). The credential is vetted in Valid Credential (441), just as it would from a directly attached credential reader. Because this credential is valid, control passes out the "Yes" branch to Activates the Grant Contact (443). This generates a condition (444) that the Pseudo-Reader panel FIG. 1 (107a) checks indicating the credential indicium is valid. A contact timer is started, Start Timer (445), and the contact timer is tested, Timer Expired (446). If the "No" branch is taken the contact timer is tested again. If the timer has expired, the "Yes" branch is taken. The grant contact is deactivated in Deactivate Contact (447) and control is returned to the entity's legacy access control panel kernel software in Return to Kernel (448).

When the Pseudo-Reader panel FIG. 1 (107a) tests the Grant Contact for Active (429) and control passes out the "Yes" branch, the step Send a Grant Message (431) is called sending a grant message (432) to the originating network enabled access control panel FIG. 1 (110a).

A grant message (432) received by the network enabled access control panel FIG. 1 (110a) causes the kernel software to pass control to Grant Message Event (406). The transaction timer is started in Start Timer (404) then tested in Timer Expired (407). For this example, assume the transaction has not gone stale and, in fact, is the same indicium as used when the Start Timer (404) was last called. Therefore, the transaction passes the timer and indicium match test and the "No" branch is taken. The portal FIG. 1 (209a) is released in Unlock Portal (408), and control is returned back to the kernel software in the final step Return to Kernel (409).

The transaction timer is coupled to the most recent credential reading and continues to run after returning to kernel. After the transaction timer expires any grant messages for that credential read are ignored. The credential indicium may be used as a transaction identification as is illustrated in the message schematics shown in FIG. 7. Alternatively, a transaction number may be generated which couples indicium, the timer, and/or a read time to the transaction messages. Network routers and other interconnection devices might cause latencies or duplicated messages when certain network protocols are employed. A delayed or duplicated grant message could result in the lock being released again some time after the credential holder has left the portal area. This problem is addressed by having credential transactions expire after some adjustable time. The network enabled access control panel tests the transaction's freshness with Timer Expired (407). If the transaction has gone stale the grant message is ignored.

The portal unlock time may be adjusted by sending a "Handicap" message indicating the credential holder needs more time to negotiate the portal. The "Handicap" message may include an optional time field which indicates how much additional time may be required. The "Handicap" message may be handled in a manner similar to the grant message.

A test for a Deny contact closure between the grant contact testing (429) and timer testing (430) is another embodiment of the present invention. If the Deny contact closure was detected, then an appropriate message is transmitted and subsequently control would pass back to the kernel software (433). In a similar fashion, tests for the Handicap relay closure may be incorporated between grant contact testing (429) and timer testing (430). However, it may be advantageous to send both the valid credential message (432) and the Handicap message if both contacts within the entity's legacy access control panel FIG. 1 (202a) are closed. Also, this Handicap message may be generated if the entity's legacy access control system panel FIG. 1 (202a) holds the grant contacts closed for a period that exceeds a predefined threshold.

Referring to FIG. 5, the network processor (501), the voltage sources (503, 507), the relay (504), the connections (505, 506, 510, 511, and 512), the I/O pins (502, 513, and 515), the input buffers (514, 516), and the pull up resistors (508, 509) are representative components of the network enabled access control panel shown in FIG. 1 (110a).

The operation of the network enabled access control panel FIG. 1 (110a) hardware can be understood by referring to FIG. 5. The network processor (501) ties to the network (112) via connection (113a). The portal locking device (208a) is controlled by the network processor output (502) and thence relay (504). When the relay (504) is energized the relay contact closure is communicated via contacts (505, 506) which tie to cable (105a) and thence to the locking device (208a). Only the network enabled access control panel (110a) release circuitry is shown for the locking device (208a). The other circuitry required to operate the lock and provide life safety functionality is not shown. Some examples of other circuitry omitted for clarity would include: the lock power supply, request to exit device, fire alarm interface, an exit button with time delay, and alarming functions to alert monitoring personnel that the lock has malfunctioned or the door has been propped open.

The Weigand interface for the reader is comprised of a "1" input (510) and a "0" input (511) and a ground return (512).

These lines are carried within the cable (106a) which connects to the credential reader (201a). Power and indication lines are also typically carried within the reader cable (106a), but these have been omitted for clarity. In accord with common practice pull-up resistors (508, 509) provide current from a 5 volt source (507) at the access panel. The optimal values of these resistors are determined by the reader manufacturer, but a typical value is 560 ohms. The input signals are conditioned by Schmitt buffers (514, 516) to provide proper electrical levels to network processor inputs (513, 515). As is known to those skilled in the art, ordinary buffers may be used in lieu of the Schmitt buffers in certain applications. Additionally, the buffers may be incorporated into the network processor (501). As this diagram is to illustrate the logical flow of the present invention, surge suppression circuitry typically included for electrical inputs from field equipment has been omitted for clarity.

To release the portal the output relay (504) coil is energized by network processor output (502). The top terminal of relay coil (504) is tied to a current source (503) and the bottom of the coil is tied to the network processor output (502). As this diagram is to illustrate the logical flow of the present invention, surge suppression circuitry typically required for interfacing electromagnetic relay coils to sensitive circuitry has been omitted for clarity. Two examples of this circuitry would be a Metal Oxide Varistor and a back diode. Both are employed across the relay coil to limit the inductive voltage spike when the relay is de-energized.

Any number of known methods may be employed to effect the translation of the network processor output (502) to a contact closure for the locking device (208a). As is known to those skilled in the art, a photovoltaic relay and LED current limiting resistor may be substituted for the electromechanical relay. An example of a photovoltaic relay is the PVG612A manufactured by International Rectifier. The resistor typically limits the LED current to a value between 5 and 20 milliamps. Also known to those skilled in the art, if the relay coil or LED in a photovoltaic relay requires either more current and/or voltage than can be directly provided by the network processor output (502), then a buffer amplifier may be employed to interface the network processor (501) with the panel's output device (504).

Referring to FIG. 6, the network processor (601), the voltage source (610), the connections (614, 615, 616, 617, 618, 619 and 620), the I/O pins (602, 604, 606, 608 and 621), the input buffers (607, 609, and 622), the open collector output buffers (603, 605) and the pull up resistors (611, 612, and 613) are representative components of the Pseudo-Reader panels shown in FIG. 1 (107a, 107b, and 107c).

Referring to FIG. 6 the operation of the Pseudo-Reader panel hardware can be understood. The network enabled microprocessor or network processor (601) is tied to the network (112) via connection (111).

The pseudo-reader output that mimics a Weigand output is composed of output buffers (603, 605) presenting open collector outputs to the entity's legacy access control panel at points (614, 616). A ground return is provided at (615). All three signal lines connect with the entity's legacy access control panel (202) via cable (206). The buffers are driven by network processor output lines (602, 604) and may be incorporated into the network processor itself. One implementation employs two sections of a TTL Hex Buffer, commonly known as a 7407, or the equivalent as the output buffer. Another implementation of the buffer uses two NPN transistors. Two resistors connect the respective bases of the transistors to the respective network processor output lines (602, 604), limiting the current flowing from the network processor output lines (602, 604) into the bases of the transistors. The collectors of these transistors would connect to the respective output points (614, 616) and the emitters would connect to ground (615). Yet another variation uses the network processor output lines (602, 604) directly as the open collector buffering circuitry incorporated into certain network processor outputs.

Weigand card reader inputs on an access control panel provide a current source through pull-up resistors and the access control panel monitors the circuits for closures of forty to seventy microseconds to ground. Each closure to ground indicating either a "1" or a "0" bit, as documented in Mr. Sprik's AN004.DOC on page 9. Each pulse is separated by an idle period of two milliseconds. It is undefined if both lines are closed to ground at the same time.

The network processor (601) transmits a "1"s bit by pulsing the buffer associated with the connection (616). The buffer associated with the connection (614) transmits a "0" bit when it is pulsed.

The network processor inputs (606, 608, and 621) monitor the entity's legacy access control panel outputs for Grant, Deny, and Handicap. Schmitt input buffers (607, 609, and 622) condition the signals to satisfy the input requirements of the network processor.

The entity's legacy access control panel (202) relay outputs connect with input terminals (617, 618, 620) and ground return (619) via cable (205). The Grant relay lower contact is connected to ground (619) and the upper contact is tied to input (617). The resistor (612) top terminal is tied to a voltage source (610). When the relay is relaxed the voltage at the input point (617) is pulled by the resistor (612) to a value near the voltage source (610). When the entity's legacy access control panel (202) Grant relay is energized the voltage at the input point (617) is brought to ground by the closure of contacts. The input buffer (607) adjusts this signal to the level appropriate for the network processor (601) input (606). As described above when this contact closure is detected a "Grant" message will be generated and transmitted by the network processor (601) over the network (112). This "Grant" message may be echoed to a monitoring computer FIG. 1 (115) for audit purposes An embodiment of the present invention where the entity's legacy access control panel (202) includes a Deny relay contact is also shown in FIG. 6. It should be noted that not all legacy access panels have a Deny relay. The Deny relay's lower contact is connected to ground (619) and the upper contact is tied to input (618). The resistor (613) top terminal is tied to a voltage source (610). When the relay is relaxed the voltage at the input point (618) is pulled by the resistor (613) to a value near the voltage source (610). When the entity's legacy access control panel (202) Deny relay is energized the voltage at the input point (618) is brought to ground by the closure of contacts. The input buffer (609) adjusts this signal to the level appropriate for the network processor (601) input (608). As described above when this contact closure is detected a "Deny" message may be generated and transmitted by the network processor (601) over the network (112). This "Deny" message may be echoed to a monitoring computer FIG. 1 (115) for audit and/or monitoring personnel alerting purposes.

If the entity's legacy access control panel (202) does not include a Deny relay contacts or if neither the Deny relay contacts or the Grant relay contacts close within a preset period of time a "Deny" message and/or a "Timeout" message may be generated and transmitted by the network processor (601) over the network (112). This message may be echoed to a monitoring computer FIG. 1 (115) for audit and/or monitoring personnel alerting purposes.

An embodiment of the present invention where the entity's legacy access control panel (202) includes a Handicap relay contact is also shown in FIG. 6. It should be noted that not all legacy access panels have a Handicap relay. The Handicap relay's lower contact is connected to ground (619) and the upper contact is tied to input (620). The resistor (611) top terminal is tied to a voltage source (610). When the relay is relaxed the voltage at the input point (620) is pulled by the resistor (611) to a value near the voltage source (610). When the entity's legacy access control panel (202) Handicap relay is energized the voltage at the input point (620) is brought to ground by the closure of contacts. The input buffer (622) adjusts this signal to the level appropriate for the network processor (601) input (621). As described above when this contact closure is detected a "Handicap" message may be generated and transmitted by the network processor (601) over the network (112). When the "Handicap" message is received by the network enabled access control panel FIG. 1 (110a) the locking device FIG. 1 (208a) is released for an extended period of time, typically to allow the credential holder to negotiate the portal FIG. 1 (209a) with a wheelchair or other aid. This "Handicap" message may be echoed to a monitoring computer FIG. 1 (115) for audit and/or monitoring personnel alerting purposes.

Another embodiment of the present invention measures the time the entity's legacy access control panel's (202) Grant contacts are closed. If the closure time exceeds a predefined threshold then the "Handicap" message would be generated and transmitted by the network processor (601).

Another embodiment of the present invention measures the time the entity's legacy access control panel's (202) Grant contacts are closed. If the closure time exceeds a predefined threshold then the "Handicap" message including the measured Grant contact closed time would be generated and transmitted by the network processor (601).

A further embodiment of the present invention periodically tests the entity's legacy access control panel's (202) Grant contacts after the initial "Grant" message was sent. The testing period would be less than or equal to the normal open time for the locking device FIG. 1 (208a). The testing would terminate when the Grant contacts return to their normal state. If the contacts remain closed additional "Grant" messages would be periodically sent thus extending the release time of the locking device. A preset limit placed on the maximum number of "Grant" messages or the maximum release time would prevent a malfunction within the legacy access control panel from releasing the lock indefinitely.

The diagram shows Schmitt buffers (607, 609, and 622) to condition the relay contact outputs of the entity's legacy access control panel (202). Known by those skilled in the art, the output characteristics from the entity's legacy access control panel (202) may require either an ordinary buffer or a buffer incorporating de-bounce circuitry may be used or required.

Figure 3A:
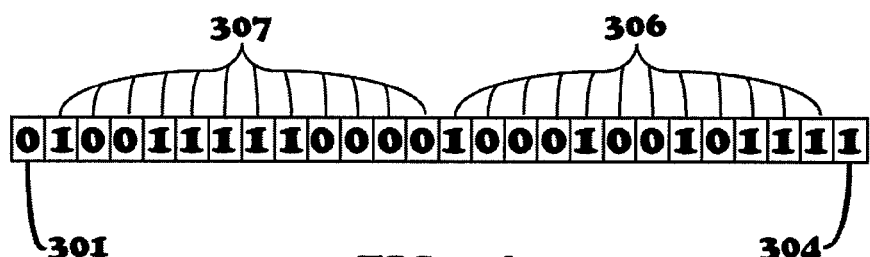
FIGS. 3A and 3B illustrate a prior art technique for typical coding of a credential.
Figure 3B:
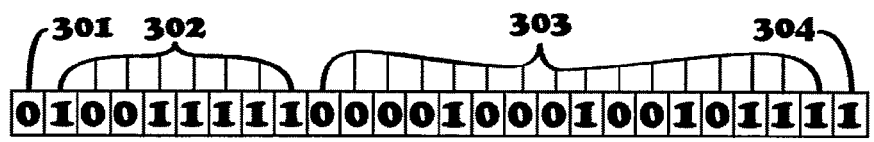
Figure 7:
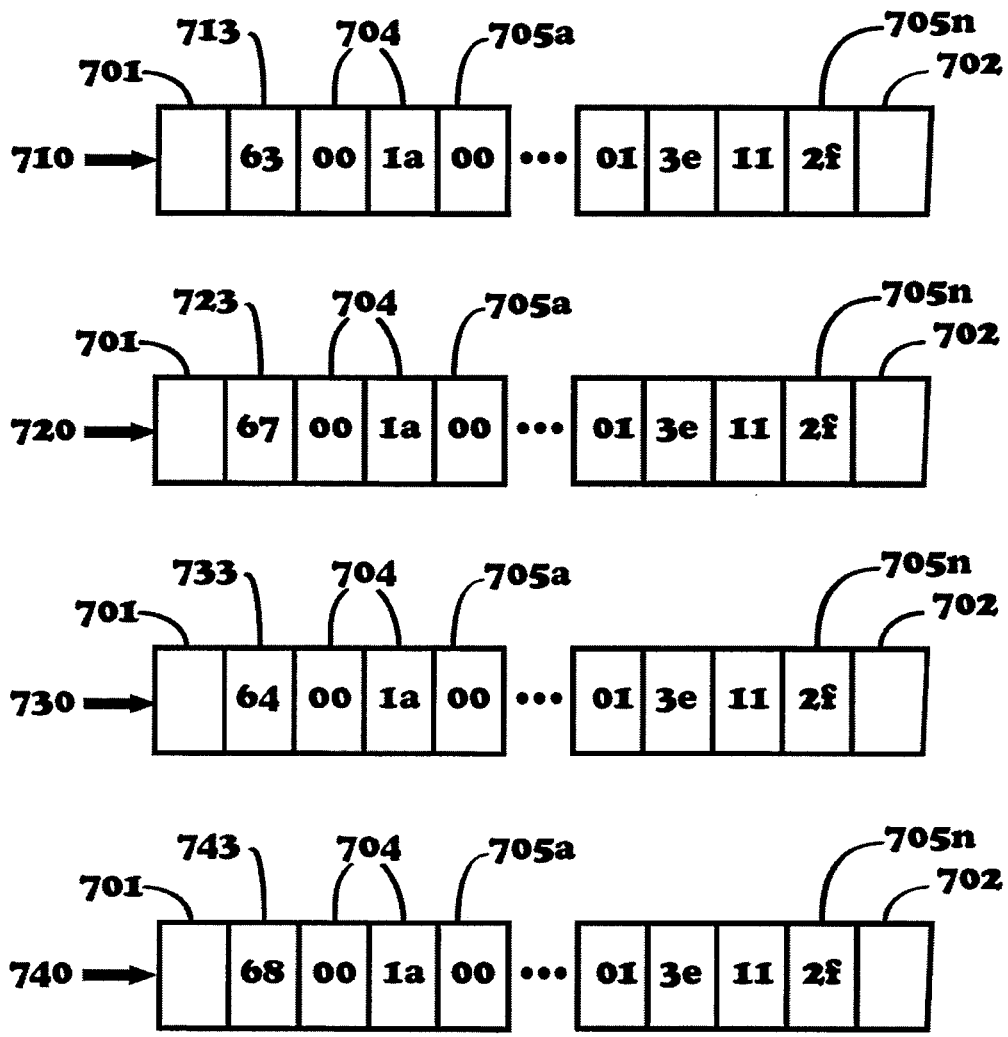
FIG. 7 illustrates network message coding.

Referring to FIG. 7 a network message coding is presented. Message (710) is an example credential message FIG. 4A (403). The multi-byte field (701) is the network message preamble required by network protocols. If UDP/IP (universal datagram protocol/internet protocol) were employed it would contain the source computer identifier and routing information used by the network to deliver the message. Additional information fields in the UDP/IP preamble are the message length and message error checking. Similarly, the multi-byte field (702) is the message post amble and in some instances may contain error checking and other information. In UDP/IP this field is null. Single byte field (713) is the species code indicating the message type. In this example the ASCII character "c", shown as hexadecimal "63", indicates a Credential Request. The two byte field (704) indicates the number of bits in the credential. The multi-byte field (705a through 705n) shown is the right justified bits of the credential indicium, shown here as two digit hexadecimal numbers indicating the byte values. The credential indicium used as an example in these diagrams is the same as shown in FIG. 3A and FIG. 3B, a 26 bit card with a Facility Code 159 and Personal Identifier 2199.

Message (720) is an embodiment of a grant message FIG. 4B (415). The multi-byte fields (701, 702) are the network message preamble and post amble described above. Single byte field (721) is the species code indicating the message type. In this example the ASCII character "g", shown as hexadecimal "67", indicates a grant message. The two byte field (704) shown indicates the number of bits in the credential. The multi-byte field (705a through 705n) is the right justified bits of the credential indicium, shown here with two digit hexadecimal numbers indicating the byte values.

Message (730) is an embodiment of a deny message format. The multi-byte fields (701, 702) are the network message preamble and post amble described above. Single byte field (731) is the species code indicating the message type. In this example the ASCII character "d", shown as hexadecimal "64", indicates a deny message. The two byte field (704) indicates the number of bits in the credential. The multi-byte field (705a through 705n) shown is the right justified bits of the credential indicium, shown here as two digit hexadecimal numbers indicating the byte values.

Message (740) is an embodiment of a handicap message. The multi-byte fields (701, 702) are the network message preamble and post amble described above. Single byte field (741) is the species code indicating the message type. In this example the ASCII character "h" shown as hexadecimal "68" indicates a handicap message. The three byte field (704) indicates the number of bits in the credential. The multi-byte field (705a through 705n) shown is the right justified bits of the credential indicium, shown here as two digit hexadecimal numbers indicating the byte values.

An alternative embodiment of the multi-byte field (705a through 705n) uses the credential read time, a timer identifier, and/or the credential indicium to produce a unique identifier for the transaction.

Referring to FIG. 5 (501) and FIG. 6 (601) a typical embodiment of a network processor may be found in either the Lantronics, Inc. XPORT Embedded Ethernet Device Server or the Digi International Inc. ME connector style embedded module. As is known to those skilled in the art, the network processor may also be implemented as microprocessor coupled with a network enabling peripheral.

Referring to FIG. 6 an alternative embodiment of the network processor (601) moves the credential indicium output generation into secondary processor or programmable logic array. An example of a secondary processor is found in the Texas Instruments MSP430 family of processors. Upon reception of a command from the network processor the secondary processor generates the pseudo-reader pulses and/or monitor the legacy access control panel's outputs. The offloading of the pulse generation and/or input monitoring may offer cost or other advantages over using a single higher speed processor with five I/O pins as illustrated in (601). The two processors may be interconnected with any one of a number of techniques known to those skilled in the art. Some interconnection techniques between the two processors are serial I/O, SPI, and I²C protocols.

Moreover though the description of the invention has included description of one or more embodiments and certain variation and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps are disclosed herein, and without intending to publicly dedicate any patentable subject matter.

I claim:

1. An integration system for use with a plurality of autonomous access control systems, wherein said access control systems comprise separately maintained databases of permitted access indicia, and wherein said integration system accepts an access request from one point and communicates said access request to said access control systems, which have a different function from said integration system, said integration system comprising
 a reader capable of receiving an access indicium from a user requesting access to a controlled area or system,
 a data network in signal communication with said reader and capable of directing said access indicium to a particular access control system, and
 a plurality of receivers in signal communication with said data network, each of said receivers in signal communication with an access control system, and capable of receiving said access indicium, providing said access indicium to its respective access control system via a pseudo-reader, receiving from said access control system a signal indicating whether said access indicium is valid, and, if said access indicium is valid, transmitting a signal to an access control device to allow access to a controlled area or system.

2. The system of claim 1, wherein said access indicium comprises a facility code identifying the access control system to which the access indicium should be directed.

3. The system of claim 1, wherein an access control system receiving said access indicium returns a denial of access signal if it determines that said access indicium is invalid.

4. The system of claim 1, wherein said access control device comprises a timer determining a period of time within which the access control device must receive said signal to allow access to a controlled area or system.

5. The system of claim 1, wherein said signal to said access control device comprises an access hold open time.

6. The system of claim 1, wherein said access control device comprises a means of limiting the access hold open time.

7. The system of claim 1, additionally comprising a data log in signal communication with said data network.

8. The system of claim 7, wherein said data log records data related to attempts to utilize invalid access indicia.

9. The system of claim 7, wherein said data log records an audit of communications transmitted via said data network.

* * * * *